Patented Dec. 21, 1971

3,629,375
SULFINYL THIOL- AND DITHIO-PHOSPHATES

Paul C. Aichenegg, Prairie Village, Kans., and Richard A. Thornhill, Kansas City, Mo., assignors to Chemagro Corporation, Kansas City, Mo.
No Drawing. Filed Mar. 4, 1969, Ser. No. 804,272
Int. Cl. C07f 9/16; A01n 9/36
U.S. Cl. 260—934                  12 Claims

ABSTRACT OF THE DISCLOSURE

Sulfinyl thiol- and dithio-phosphates, i.e. O,O-dialkyl-S-(trichloroethyl and dichlorovinyl sulfinyl)-thiol- and dithio-phosphates, or O,O-dialkyl-S-(trichloroethyl thionyl and dichlorovinyl thionyl) thiol- and thionothiol-phosphates, which possess strong fungicidal, nematocidal and insecticidal properties and which may be produced by conventional methods.

---

The present invention relates to and has for its objects the provision for particular new sulfinyl thiol- and dithio-phosphates, i.e. O,O-dialkyl-S-(trichloroethyl and dichlorovinyl sulfinyl)-thiol- and dithio-phosphates, or O,O-dialkyl-S-(tricholoethyl thionyl and dichlorovinyl thionyl) thiol- and thionothiol-phosphates, which possess valuable pesticidal, especially fungicidal, nematocidal and insecticidal, properties, active compositions in the form of mixtures of such compounds with solid and liquid dispersible carrier vehicles, and methods for producing such compounds and for using such compounds in a new way, especially for combating fungal diseases, nematode infestations, and insect pests and the like, with other and further objects becoming apparent from a study of the within specification and accompanying examples.

It is not believed that any sulfinyl thiol- and/or dithio-phosphates of analogous constitution are known and/or are known to possess combined fungicidal, nematocidal and insecticidal properties.

It has now been found, in accordance with the present invention, that the particular new sulfinyl thiol- and dithio-phosphates of the general formula

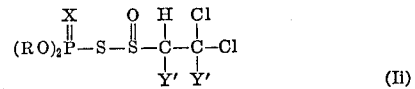

in which:
R is alkyl of 1–4 carbon atoms,
R' is trichloroethyl or dichlorovinyl, especially having at most one α-chloro group, and
X is oxygen or sulfur, exhibit strong fungicidal, nematocidal and insecticidal properties.

It has been furthermore found, in accordance with the present invention, that the compounds of Formula I above may be produced by a process which comprises (a) Reacting a thiol- or dithio-phosphoric acid ester of the formula

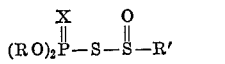

in which R and X are the same as defined above, with trichloroethyl or dichlorovinyl sulfinyl chloride of the respective formulae

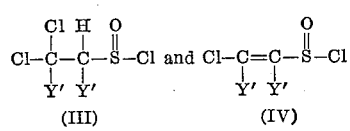

in which correspondingly one Y' is chlorine and the other Y' is hydrogen, optionally in the presence of a solvent, or (b) Reacting the corresponding O,O-alkyl-S-(trichloroethyl sulfinyl)-thiol- or dithio-phosphate of the formula

in which R, X and Y' are the same as defined above, with a dehydrochlorinating agent in the presence of a solvent.

Suprisingly, the sulfinyl thiol- and dithio-phosphates of the instant invention are chemically completely novel compounds unobvious over the prior art. Because of their combined fungicidal, nematocidal and insecticidal properties and their broad spectrum of activity, the instant compounds therefore represent a valuable enrichment of the art.

According to reaction variant (a), if for instance 2,2-dichlorovinyl sulfinyl chloride (IVa) and O,O-dimethyl dithiophosphoric acid (IIa) are used as starting materials, the course of the reaction can be represented by the following equation:

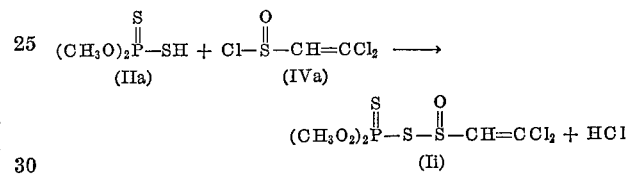

According to reaction variant (b), the corresponding vinyl sulfinyl thiol- and dithio-phosphates of Formula I, i.e. in which R' is vinyl, may alternatively be obtained by dehydrochlorinating the trichloroethyl sulfinyl thiol- or dithio-phosphate of Formula Ii in the presence of a dehydrochlorinating agent such as tertiary amine or an alkoxide, according to the following equation:

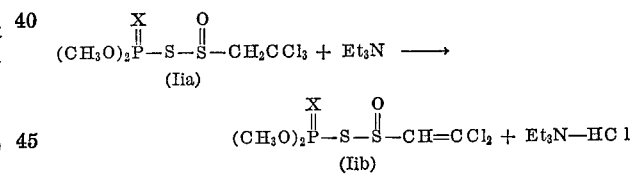

Advantageously, in accordance with the present invention, in the various formulae herein, R represents lower alkyl hydrocarbon of 1–4 carbon atoms, such as methyl, ethyl, n-propyl, isopropyl, n-butyl, isobutyl, sec.-butyl, tert.-butyl, and the like, especially $C_{1-3}$, or $C_{1-2}$, alkyl, and more especially methyl and ethyl;

R' represents trichloroethyl, preferably having at least one terminal or β-chloro group, i.e. at most one chloro group in α-position to the adjacent sulfinyl group, such as 2,2,2- and 1,2,2-trichloro ethyl; or dichlorovinyl, i.e. having at least one terminal or β-chloro group, i.e. at most one chloro group in α-position to the adjacent sulfinyl group, such as 2,2- and 1,2-dichlorovinyl; and
X represents oxygen; or sulfur.

Preferably, R is $C_{1-2}$ alkyl, R' is trichloroethyl or dichlorovinyl and X is oxygen or sulfur, both symbols R being the same.

Furthermore, especially where R is $C_{1-2}$ alkyl, R' is preferably 2,2,2-trichloroethyl when X is oxygen or sulfur; or R' is preferably 1,2,2-trichloroethyl when X is oxygen or sulfur, or R' is preferably 2,2-dichlorovinyl when X is oxygen or sulfur; or R' is preferably 1,2-dichlorovinyl when X is oxygen or sulfur.

Preferred compounds include:

(9) O,O-dimethyl-S-(2,2-dichlorovinyl-sulfinyl)thiol-phosphate;
(14) O,O-dimethyl-S-(1,2,2-trichloroethyl-sulfinyl)-dithio-phosphate;
(8) O,O-dimethyl-S-(1,2-dichlorovinyl-sulfinyl)-thiol-phosphate;
(10) O,O-diethyl-S-(1,2,2-trichloroethyl-sulfinyl)-dithio-phosphate;
(3) O,O-diethyl-S-(2,2,2-trichloroethyl-sulfinyl)-thiol-phosphate;
(4) O,O-diethyl-S-(1,2-dichlorovinyl-sulfinyl)-thiol-phosphate;
(11) O,O-diethyl-S-(2,2,2-trichloroethyl-sulfinyl)-dithio-phosphate; and
(16) O,O-dimethyl-S-(1,2-dichlorovinyl-sulfinyl)-dithio-phosphate.

The types of thiol- and dithio-phosphoric acid esters usable as starting materials in accordance with process variant (a) of the present invention are clearly characterized by Formula II noted above.

These O,O-dialkyl-thiol- and dithio-phosphoric acid esters are well known and can be prepared on an industrial scale.

As examples of such thiol- and dithio-phosphoric acid esters which can be used as starting materials for process variant (a) according to the present invention; there may be mentioned in particular:

O,O-dimethyl-thio-phosphoric acid,
O,O-dimethyl-dithio-phosphoric acid,
O,O-diethyl-dithio-phosphoric acid,
O,O-diethyl-thiol-phosphoric acid,
O,O-diisopropyl-dithio-phosphoric acid,
O,O-di-n-butyl-thiol-phosphoric acid,
O,O-di-sec.-butyl-dithio-phosphoric acid, and the like.

The types of trichloroethyl and dichlorovinyl sulfinyl chlorides usable as starting materials in accordance with process variant (a) of the present invention are clearly characterized by Formulae III and IV noted above.

These sulfinyl chlorides may be prepared by reacting the corresponding sulfenyl chlorides in acetic acid with an excess of chlorine at a temperature not exceeding 7° C. during the chlorine addition. The reaction mixture is then allowed to warm up to room temperature and to stand overnight. The mixture is then heated to 65–75° C. for one hour, volatiles are stripped off and the product fractionated in high vacuum.

Another mode of preparation of these starting sulfinyl chlorides that can be used with advantage for process variant (a) is that as described by I. Douglass, J.O.C. 33, 2105, 1968, which requires the use of the corresponding disulfides as starting materials in place of the sulfenyl chlorides.

The starting trichloroethyl and dichlorovinyl sulfenyl chlorides usable for process variant (a) may also be prepared from the corresponding disulfides as described in U.S. Pat. No. 3,293,304.

As examples of such sulfinyl chlorides which can be used as starting materials for process variant (a) according to the present invention there may be mentioned in particular:

1,2,2-trichloroethyl sulfinyl chloride,
2,2,2-trichloroethyl sulfinyl chloride,
1,2-dichlorovinyl sulfinyl chloride, and
2,2-dichlorovinyl sulfinyl chloride.

In addition to the reagents employed, the reaction according to process variant (a) may be carried out optionally in the presence of an inert organic solvent (this term also includes a mere diluent). Examples of such solvents include hydrocarbons such as petroleum ether, hexane, benzene, toluene and chlorinated hydrocarbons such as methylene chloride, dichloroethane, chloroform, carbon tetrachloride, chlorobenzene, dichlorobenzene, and the like; but the preferred solvents are chloroform or carbon tetrachloride. Other solvents such as ethers (tetrahydrofuran, diethyl ether, dioxane), esters (ethyl acetate) or ketones (acetone, cyclohexanone), and the like, have been found to result in decreased yields of the subject compounds but are still usable despite this disadvantage.

The reaction temperature for process variant (a) can be varied within a fairly wide range. In general, the reaction is carried out at substantially between about 20–150° C., preferably between about 50–100° C.

In general, for process variant (a), the reactants are used in approximately equimolar proportions or an excess of the thiol or dithio phosphoric acid ester of Formula II may be used with advantage. The latter can be removed by washing the obtained crude reaction mixture with water. The reaction can for example be carried out in such a manner that the sulfinyl chloride of Formula III or IV is added dropwise to a solution or suspension of the thiol or dithio phosphoric acid ester at room temperature (25° C.) allowing the temperature to rise (exothermic reaction), and keeping the reaction mixture at between 50 and 100° C. until the evolution of hydrogen chloride has ended.

Furthermore, in connection with the final work-up according to process variant (a), washing with water, drying of the organic solution over $MgSO_4$ and evaporating the solvent yields the corresponding sulfinyl thiophosphate of Formula I in pure form.

For process variant (b) the preferred dehydrochlorinating agent used is triethylamine in an inert organic solvent such as petroleum ether, but alkali, i.e. alkali metal alkanolate such as sodium ethoxide in ethyl alcohol or the like as solvent, can also be used successfully.

In general, for process variant (b), an equimolar amount of the dehydrochlorinating agent, i.e. base, is added to the trichloroethyl sulfinyl thiol- or dithio-phosphate at between 25 and 50° C. and the reaction mixture held at temperatures ranging from 50–100° C. until the formation of the base hydrochloride, e.g. amine hydrochloride or sodium chloride, respectively, has ended.

For the final work-up according to process variant (b), filtration, washing with water, drying of the organic solution over $MgSO_4$ and high vacuum evaporation of the solvent used yields the corresponding vinyl sulfinyl phosphate in pure form.

Advantageously, the active compounds according to the present invention exhibit strong fungicidal, nematocidal and insecticidal properties with comparatively low toxicity to warm-blooded creatures and concomitantly low phytotoxicity. Hence, the instant compounds are suitable for use as plant protection agents, and in the hygiene field, for the control of fungi, nematodes and insects.

As to the fungicidal properties, the instant compounds possess a broad spectrum of activity.

Thus, the instant compounds can be used for the control of fungi from the most widely different classes of fungi, such as for example Archimycetes, Phycomycetes, Ascomycetes, Basidiomycetes, *Fungi imperfecti*, and the like. The instant compounds can give particularly effective results against parasitic fungi on above-ground parts of plants, fungi causing tracheomycosis, which attack the plant from the soil, seed-borne fungi, and soil-borne fungi, such as the organisms *Ceratocystis ulmi, Colletotrichum obiculare, Fusarium lycopersici, Fusarium nivale, Helminthosporium satirum, Rhizoctonia solani, Verticillium alboatrum, Pythium, Alternaria, Ustilago*, and the like.

As to the nematocidal properties, the instant compounds have outstanding activity. Thus, the instant compounds can also be used for the control of nematodes of the saprophytic type Panagrellus and Rhabditis ssp., and the like.

As to the insecticidal properties, the insecticidal action sets in rapidly and is long-lasting.

Thus, the instant compounds can furthermore be used with very favorable results for the control of noxious biting insects and Diptera.

With the biting insects contemplated herein there are classed, in the main, beetles, such as the confused flour beetle (*Tribolium confusum*).

The Diptera contemplated herein comprise in particular flies, such as the housefly (*Musca domestica*).

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface- active agents, including emulsifying agents and/or dispersing agents, whereby, for example, in the case where water is used as diluent, organic solvents may be added as auxiliary solvents. The following may be chiefly considered for use as conventional carrier vehicles for this purpose: Inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohol (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, insecticides or nematocides, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0001–2.0%, preferably 0.01–0.8%, by weight of the mixture. Thus, the present invention contemplates overall compositions which comprise mixtures of a conventional dispersible carrier vehicle such as (1) a dispersible inert finely divided carrier solid and/or (2) a dispersible carrier liquid such as an inert organic solvent and/or water preferably including a surface-active effective amount of a carrier vehicle assistant, e.g. surface-active agent, such as an emulsifying agent and/or a dispersing agent, and an amount of the active compound which is effective for the purpose in question and which is generally between about 0.0001–95%, and preferably 0.01–95%, by weight of the mixture.

The active compound can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight, of the active compound, or even the 100% active substance alone, e.g. about 20–100% by weight of the active compound.

Furthermore, the present invention contemplates methods of selectively killing, controlling or combating pests, i.e. fungi, nematodes and/or insects, which comprise applying to at least one of (a) such fungi, (b) such nematodies, (c) such insects, and (d) the corresponding habitat, i.e. the locus to be protected. a correspondingly pesticidally toxic amount, i.e. a fungicidally, nematocidally and/or insecticidally effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application, and may be varied within a fairly wide range, depending upon the weather conditions, the purpose for which the active compound is used, and the type locus to be treated. Therefore, in special cases, it is possible to go above or below the aforementioned concentration ranges.

In commercial practice, the compositions when used as fungicides and nematocides according to the present invention are usually applied to the soil infected with fungi and nematodes.

The outstanding fungicidal, nematocidal and insecticidal activity of the particular active compounds of the present invention is illustrated, without limitation, by the following examples.

EXAMPLE 1.—FUNGICIDAL ACTIVITY

Agar plate fungicide test [mycelium growth]

Solvent: Parts by wt.
  Distilled water _____ 99
Dispersing agent:
  Polyoxyethylene sorbitane monolaurate ("Tween 20").

To product a suitable preparation of the particular active compound, 1 part by weight of such active compound is mixed with the stated amount of solvent containing the stated amount of dispersing agent.

The active compound preparation is added to potato dextrose agar (which has been liquefied by heating) in such an amount that the desired concentration of active compound is provided therein. After thorough shaking to achieve a uniform dispersion of the active compound, the agar is poured into Petri dishes under sterile conditions. Control dishes to which the active compound preparation has not been added are also set up.

When the mixture of substrate and active compound has solidified, the dishes are inoculated in the center of the plate with the species of gungi stated in the table and incubated at room temperature (21–25° C.) for 7 days.

After this time, the extent of mycelial growth is determined to relation to the growth of the untreated control by measuring the average radius of the fungal colony from the central point of inoculation to the periphery of mycelial growth. The inhibition of fungal growth is expressed by the values 0 to 10, wherein 0 means that there is no inhibition (full growth as in control and 10 means that there is complete inhibition (absence of growth).

The particular active compounds tested, there concentrations in the agar used, the test fungi and the inhibition effects achieved can be seen from the following Table 1:

To produce a suitable preparation of the particular active compound, 1 part by weight of such active compound is mixed intimately with 1 part by weight of the stated wettable powder base.

Separate 0.1 and 0.025 part by weight portions, respectively, of the resulting mixture are blended in turn with 2 parts by weight of clay (attapulgite) and 500 parts by weight of soil infected with the damping off organism (Pythium), to provide 2 corresponding soil portions. The Pythium infested soil is prepared by mixing thoroughly Pythium cultures from 20–30 agar plates with 50 lbs. of steam-sterilized soil and adding 500 ml. of pea seeds to maintain virulence.

After standing at room temperature for 24 hours, each said active compound-containing soil portion is divided

TABLE 1.—AGAR PLATE FUNGICIDE TEST

| Active compound | | Conc. in p.p.m. | Ceratocystis ulmi | Colletotrichum obiculare | Fusarium lycopersici | Fusarium nivale | Helminto-sporium sativum | Rhizoctonia solani | Verticillium alboatrum | Pythium |
|---|---|---|---|---|---|---|---|---|---|---|
| ($2_1$) | $(C_2H_5O)_2\overset{O}{\overset{\|}{P}}-S-\overset{O}{\overset{\|}{S}}-CHCl-CHCl_2$ | 500<br>100<br>10 | 10<br>10<br>8 | 10<br>0<br>0 | 10<br>5<br>2 | 10<br>2<br>0 | 10<br>10<br>5 | 10<br>10<br>10 | 10<br>5<br>2 | 10<br>5<br>5 |
| ($3_1$) | $(C_2H_5O)_2\overset{O}{\overset{\|}{P}}-S-\overset{O}{\overset{\|}{S}}-CH_2CCl_3$ | 500<br>100<br>10 | 10<br>8<br>2 | 8<br>5<br>0 | 10<br>5<br>5 | 5<br>2<br>0 | 10<br>5<br>0 | 10<br>10<br>10 | 10<br>8<br>8 | |
| ($4_1$) | $(C_2H_5O)_2\overset{O}{\overset{\|}{P}}-S-\overset{O}{\overset{\|}{S}}-CCl=CHCl$ | 500<br>100<br>10 | 5<br>2<br>0 | 10<br>8<br>5 | 10<br>10<br>5 | 5<br>2<br>0 | 10<br>10<br>8 | 10<br>10<br>8 | 10<br>10<br>8 | |
| ($5_1$) | $(C_2H_5O)_2\overset{O}{\overset{\|}{P}}-S-\overset{O}{\overset{\|}{S}}-CH=CCl_2$ | 500<br>100<br>10 | 8<br>5<br>0 | 8<br>5<br>0 | 10<br>10<br>5 | 10<br>10<br>5 | 10<br>5<br>0 | 10<br>5<br>0 | 10<br>8<br>8 | |
| ($6_1$) | $(CH_3O)_2\overset{O}{\overset{\|}{P}}-S-\overset{O}{\overset{\|}{S}}-CHCl-CHCl_2$ | 500<br>100<br>10 | 10<br>8<br>8 | 10<br>5<br>2 | 10<br>10<br>5 | 10<br>2<br>2 | 10<br>10<br>5 | 10<br>10<br>10 | 10<br>10<br>5 | 10<br>8<br>5 |
| ($7_1$) | $(CH_3O)_2\overset{O}{\overset{\|}{P}}-S-\overset{O}{\overset{\|}{S}}-CH_2-CCl_3$ | 500<br>100<br>10 | 8<br>5<br>2 | 8<br>2<br>0 | 10<br>8<br>0 | 5<br>2<br>0 | 10<br>5<br>5 | 10<br>10<br>0 | 10<br>10<br>0 | 10<br>5<br>0 |
| ($8_1$) | $(CH_3O)_2\overset{O}{\overset{\|}{P}}-S-\overset{O}{\overset{\|}{S}}-CCl=CHCl$ | 500<br>100<br>10 | 10<br>10<br>10 | 10<br>10<br>10 | 10<br>10<br>10 | 10<br>10<br>10 | 10<br>10<br>10 | 10<br>10<br>10 | 10<br>10<br>10 | |
| ($9_1$) | $(CH_3O)_2\overset{O}{\overset{\|}{P}}-S-\overset{O}{\overset{\|}{S}}-CH=CCl_2$ | 500<br>100<br>10 | 5<br>2<br>0 | 5<br>2<br>0 | 5<br>2<br>2 | 10<br>2<br>2 | 10<br>0<br>0 | 10<br>5<br>2 | 10<br>5<br>2 | |
| ($10_1$) | $(C_2H_5O)_2\overset{S}{\overset{\|}{P}}-S-\overset{O}{\overset{\|}{S}}-CHCl-CHCl_2$ | 500<br>100<br>10 | 10<br>10<br>10 | 10<br>10<br>10 | 10<br>10<br>10 | 10<br>10<br>10 | 10<br>10<br>10 | 10<br>10<br>10 | 10<br>10<br>10 | 10<br>10<br>5 |
| ($11_1$) | $(C_2H_5O)_2\overset{S}{\overset{\|}{P}}-S-\overset{O}{\overset{\|}{S}}-CH_2-CCl_3$ | 500<br>100<br>10 | 5<br>5<br>0 | 2<br>0<br>0 | 10<br>5<br>5 | 5<br>2<br>0 | 10<br>5<br>5 | 5<br>2<br>2 | 10<br>5<br>0 | 5<br>5<br>0 |
| ($12_1$) | $(C_2H_5O)_2\overset{S}{\overset{\|}{P}}-S-\overset{O}{\overset{\|}{S}}-CCl=CHCl$ | 500<br>100<br>10 | 8<br>5<br>2 | 5<br>0<br>0 | 10<br>5<br>0 | 2<br>0<br>0 | 8<br>5<br>5 | 10<br>8<br>5 | 10<br>8<br>8 | |
| ($13_1$) | $(C_2H_5O)_2\overset{S}{\overset{\|}{P}}-S-\overset{O}{\overset{\|}{S}}-CH=CCl_2$ | 500<br>100<br>10 | 10<br>8<br>5 | 10<br>8<br>5 | 10<br>10<br>5 | 10<br>10<br>10 | 8<br>5<br>5 | 10<br>10<br>10 | 10<br>8<br>8 | |
| ($14_1$) | $(CH_3O)_2\overset{S}{\overset{\|}{P}}-S-\overset{O}{\overset{\|}{S}}-CHCl-CHCl_2$ | 500<br>100<br>10 | 10<br>10<br>10 | 10<br>10<br>10 | 10<br>10<br>10 | 10<br>10<br>10 | 10<br>10<br>8 | 10<br>10<br>10 | 10<br>10<br>10 | 10<br>10<br>5 |
| ($15_1$) | $(CH_3O)_2\overset{S}{\overset{\|}{P}}-S-\overset{O}{\overset{\|}{S}}-CH_2-CCl_3$ | 500<br>100<br>10 | 8<br>5<br>2 | 8<br>2<br>0 | 10<br>10<br>5 | 10<br>2<br>0 | 10<br>5<br>0 | 10<br>10<br>10 | 10<br>8<br>0 | 8<br>5<br>0 |
| ($16_1$) | $(CH_3O)_2\overset{S}{\overset{\|}{P}}-S-\overset{S}{\overset{\|}{S}}-CCl=CHCl$ | 500<br>100<br>10 | 10<br>10<br>10 | 10<br>10<br>10 | 10<br>10<br>10 | 10<br>10<br>10 | 10<br>10<br>10 | 10<br>10<br>10 | 10<br>10<br>10 | |
| ($1_2$) | $(CH_3O)_2\overset{S}{\overset{\|}{P}}-S-\overset{O}{\overset{\|}{S}}-CH=CCl_2$ | 500<br>100<br>10 | 10<br>10<br>10 | 10<br>10<br>10 | 10<br>10<br>10 | 10<br>8<br>2 | 10<br>10<br>10 | 10<br>10<br>10 | 10<br>10<br>10 | |

EXAMPLE 2.—FUNGICIDAL ACTIVITY

Soil fungicide test ([rolled towel])

Wettable powder base consisting of:

| | Parts by wt. |
|---|---|
| Hydrated silica (ultra fine, "Hi-Sil 233") | 92 |
| Sodium lignin sulfonate ("Marasperse N") | 4 |
| Polycondensate of ethylene oxide, propylene oxide and propylene glycol (mol. wt. about (1000) ("Pluronic L–61") | 4 | up into three batches and 50 pea seeds are added to each batch. Each batch is then rolled in a paper towel and incubated in a separate can covered with a plastic sheet for 5 days at 4.4° C. and then for an additional 4 days at 24° C.

At the end of the 9 days, the degree of effectiveness in preventing fungal damage of the pea seeds is determined and expressed as a percentage, wherein 0% means that there is no control and 100% means that there is complete control.

The particular active compounds tested, the amounts applied and the results obtained can be seen from the following Table 2:

TABLE 2.—SOIL FUNGICIDE TEST [ROLLED TOWEL]

| Active compound | | Active compound concentration, p.p.m. | Control in percent of Pythium |
|---|---|---|---|
| ($2_2$) | $(C_2H_5O)_2\overset{O}{\underset{\|}{P}}-S-\overset{O}{\underset{\|}{S}}-CHCl-CHCl_2$ | 100<br>25 | 20<br>0 |
| ($3_2$) | $(C_2H_5O)_2\overset{O}{\underset{\|}{P}}-S-\overset{O}{\underset{\|}{S}}-CH_2CCl_3$ | 100<br>25 | 0<br>0 |
| ($4_2$) | $(C_2H_5O)_2\overset{O}{\underset{\|}{P}}-S-\overset{O}{\underset{\|}{S}}-CCl=CHCl$ | 100<br>25 | 100<br>100 |
| ($5_2$) | $(C_2H_5O)_2\overset{O}{\underset{\|}{P}}-S-\overset{O}{\underset{\|}{S}}-CH=CCl_2$ | 100<br>25 | 0<br>0 |
| ($6_2$) | $(CH_3O)_2\overset{O}{\underset{\|}{P}}-S-\overset{O}{\underset{\|}{S}}-CHCl-CHCl_2$ | 100<br>25 | 80<br>50 |
| ($7_2$) | $(CH_3O)_2\overset{O}{\underset{\|}{P}}-S-\overset{O}{\underset{\|}{S}}-CH_2-CCl_3$ | 100<br>25 | 70<br>40 |
| ($8_2$) | $(CH_3O)_2\overset{O}{\underset{\|}{P}}-S-\overset{O}{\underset{\|}{S}}-CCl=CHCl$ | 100<br>25 | 0<br>0 |
| ($9_2$) | $(CH_3O)_2\overset{O}{\underset{\|}{P}}-S-\overset{O}{\underset{\|}{S}}-CH=CCl_2$ | 100<br>25 | 0<br>0 |
| ($10_2$) | $(C_2H_5O)_2\overset{S}{\underset{\|}{P}}-S-\overset{O}{\underset{\|}{S}}-CHCl-CHCl_2$ | 100<br>25 | 90<br>70 |
| ($11_2$) | $(C_2H_5O)_2\overset{S}{\underset{\|}{P}}-S-\overset{O}{\underset{\|}{S}}-CH_2-CCl_3$ | 100<br>25 | 70<br>70 |
| ($12_2$) | $(C_2H_5O)_2\overset{S}{\underset{\|}{P}}-S-\overset{O}{\underset{\|}{S}}-CCl=CHCl$ | 100<br>25 | 0<br>0 |
| ($13_2$) | $(C_2H_5O)_2\overset{S}{\underset{\|}{P}}-S-\overset{O}{\underset{\|}{S}}-CH=CCl_2$ | 100<br>25 | 70<br>70 |
| ($14_2$) | $(CH_3O)_2\overset{S}{\underset{\|}{P}}-S-\overset{O}{\underset{\|}{S}}-CHCl-CHCl_2$ | 100<br>25 | 90<br>80 |
| ($15_2$) | $(CH_3O)_2\overset{S}{\underset{\|}{P}}-S-\overset{O}{\underset{\|}{S}}-CH_2-CCl_3$ | 100<br>25 | 80<br>30 |
| ($16_2$) | $(CH_3O)_2\overset{S}{\underset{\|}{P}}-S-\overset{O}{\underset{\|}{S}}-CCl=CHCl$ | 100<br>25 | 100<br>0 |
| ($1_3$) | $(CH_3O)_2\overset{S}{\underset{\|}{P}}-S-\overset{O}{\underset{\|}{S}}-CH=CCl_2$ | 100<br>25 | 100<br>0 |

NOTE.—100 p.p.m.=200 lbs./acre rate; 25 p.p.m.=50 lbs./acre rate.

EXAMPLE 3.—NEMATOCIDAL ACTION

Saprophytic nematode test [contact action]

Wettable powder base consisting of:

| | Parts of wt. |
|---|---|
| Hydrated silica (ultra fine, "Hi-Sil 233") | 92 |
| Sodium lignin sulfonate ("Marasperse N") | 4 |
| Polycondensate of ethylene oxide, propylene oxide and propylene glycol (mol. wt. about 1000) ("Pluronic L-61") | 4 | stated wettable powder base, and the resulting mixture is diluted with water to the desired final concentration.

To produce a suitable preparation of the particular active compound, 1 part by weight of such active compound is mixed intimately with 1 part by weight of the The active compound preparation is added to a vial and then a standard nematode suspension (i.e. 1 drop of 50–75 nematodes (Panagrellus and Rhabditis) per drop of active compound preparation) is aded thereto. The vial is incubated at room temperature (21–25° C.) for 48 hours. The ability of the particular active compound to immobilize saprophytic nematodes upon contact in aqueous suspension is determined microscopically by counting the number of non-motile (immobile) nematodes at the end of this time. The number of non-motile nematodes as compared to the total number of nematodes in the test vial determines the degree of effectiveness which is expressed as a percentage.

100% means that all, and 0% means that none, of the nematodes have been immobilized.

The particular active compounds tested, their concentrations and the results obtained can be seen from the following Table 3:

TABLE 3.—SAPROPHYTIC NEMATODE TEST [CONTACT ACTION]

| Active compound | | Active compound concentration, p.p.m. | Immobilization in percent of saprophytic nematodes |
|---|---|---|---|
| ($2_3$) | $(C_2H_5O)_2\overset{O}{\underset{\|}{P}}-S-\overset{O}{\underset{\|}{S}}-CHCl-CHCl_2$ | 200<br>100<br>50<br>25<br>12.5 | 100<br>100<br>100<br>80<br>50 |
| ($3_3$) | $(C_2H_5O)_2\overset{O}{\underset{\|}{P}}-S-\overset{O}{\underset{\|}{S}}-CH_2CCl_3$ | 200<br>100<br>50 | 80<br>80<br>10 |
| ($4_3$) | $(C_2H_5O)_2\overset{O}{\underset{\|}{P}}-S-\overset{O}{\underset{\|}{S}}-CCl=CHCl$ | 200<br>100<br>50 | 50<br>10<br>10 |
| ($5_3$) | $(C_2H_5O)_2\overset{O}{\underset{\|}{P}}-S-\overset{O}{\underset{\|}{S}}-CH=CCl_2$ | 200<br>100<br>50 | 100<br>80<br>50 |
| ($6_3$) | $(CH_3O)_2\overset{O}{\underset{\|}{P}}-S-\overset{O}{\underset{\|}{S}}-CHCl-CHCl_2$ | 200<br>100<br>50<br>25<br>12.5 | 100<br>80<br>50<br>0<br>0 |
| ($7_3$) | $(CH_3O)_2\overset{O}{\underset{\|}{P}}-S-\overset{O}{\underset{\|}{S}}-CH_2CCl_3$ | 200<br>100<br>50<br>25<br>12.5 | 100<br>80<br>50<br>0<br>0 |
| ($8_3$) | $(CH_3O)_2\overset{O}{\underset{\|}{P}}-S-\overset{O}{\underset{\|}{S}}-CCl=CHCl$ | 200<br>100<br>50 | 100<br>80<br>50 |
| ($9_3$) | $(CH_3O)_2\overset{O}{\underset{\|}{P}}-S-\overset{O}{\underset{\|}{S}}-CH=CCl_2$ | 200<br>100<br>50 | 80<br>50<br>10 |
| ($10_3$) | $(C_2H_5O)_2\overset{S}{\underset{\|}{P}}-S-\overset{O}{\underset{\|}{S}}-CHCl-CHCl_2$ | 200<br>100<br>50<br>25<br>12.5 | 80<br>50<br>50<br>0<br>0 |
| ($11_3$) | $(C_2H_5O)_2\overset{S}{\underset{\|}{P}}-S-\overset{O}{\underset{\|}{S}}-CH_2CCl_3$ | 200<br>100<br>50<br>25<br>12.5 | 80<br>50<br>50<br>50<br>0 |
| ($12_3$) | $(C_2H_5O)_2\overset{S}{\underset{\|}{P}}-S-\overset{O}{\underset{\|}{S}}-CCl=CHCl$ | 200<br>100<br>50 | 80<br>50<br>50 |
| ($13_3$) | $(C_2H_5O)_2\overset{S}{\underset{\|}{P}}-S-\overset{O}{\underset{\|}{S}}-CH=CCl_2$ | 200<br>100<br>50 | 100<br>50<br>10 |
| ($14_3$) | $(CH_3O)_2\overset{S}{\underset{\|}{P}}-S-\overset{O}{\underset{\|}{S}}-CHCl-CHCl_2$ | 200<br>100<br>50<br>25<br>12.5 | 100<br>80<br>50<br>30<br>0 |
| ($15_3$) | $(CH_3O)_2\overset{S}{\underset{\|}{P}}-S-\overset{O}{\underset{\|}{S}}-CH_2CCl_3$ | 200<br>100<br>50<br>25<br>12.5 | 50<br>30<br>0<br>0<br>0 |
| ($16_3$) | $(CH_3O)_2\overset{S}{\underset{\|}{P}}-S-\overset{O}{\underset{\|}{S}}-CCl=CHCl$ | 200<br>100<br>50 | 100<br>100<br>100 |
| ($1_4$) | $(CH_3O)_2\overset{S}{\underset{\|}{P}}-S-\overset{O}{\underset{\|}{S}}-CH=CCl_2$ | 200<br>100<br>50 | 100<br>100<br>80 |

EXAMPLE 4.—INSECTICIDAL ACTION

Confused flour beetle test [contact action]
(*Tribolium confusum*)

Solvent: 10 milliliters acetone.

To produce a suitable preparation of the particular active compound, 100 mg. of such active compound are mixed with the stated amount of the stated volatile solvent, and the resulting concentrate is diluted with further solvent to the desired final concentration.

The particular active compounds tested, the amounts used and the results obtained can be seen from the following Table 4:

TABLE 4.—CONFUSED FLOUR BEETLE TEST [CONTACT ACTION]

| Active compound | | Amount of active compound applied in mmg./dish | Flour beetle mortality in percent after exposure of— | |
|---|---|---|---|---|
| | | | 2 hrs. | 18 hrs. |
| ($2_4$) | $(C_2H_5O)_2\overset{O}{\underset{\|}{P}}-S-\overset{O}{\underset{\|}{S}}-CHCl-CHCl_2$ | 1,000<br>100<br>10 | 100<br>100<br>0 | 100<br>100<br>0 |
| ($3_4$) | $(C_2H_5O)_2\overset{O}{\underset{\|}{P}}-S-\overset{O}{\underset{\|}{S}}-CH_2CCl_3$ | 1,000<br>100<br>10 | 100<br>40<br>0 | 100<br>100<br>50 |
| ($4_4$) | $(C_2H_5O)_2\overset{O}{\underset{\|}{P}}-S-\overset{O}{\underset{\|}{S}}-CCl=CHCl$ | 1,000 | 80 | 100 |
| ($5_4$) | $(C_2H_5O)_2\overset{O}{\underset{\|}{P}}-S-\overset{O}{\underset{\|}{S}}-CH=CCl_2$ | 1,000 | 60 | 100 |
| ($6_4$) | $(CH_3O)_2\overset{O}{\underset{\|}{P}}-S-\overset{O}{\underset{\|}{S}}-CHCl-CHCl_2$ | 1,000<br>100<br>10 | 100<br>30<br>0 | 100<br>70<br>0 |
| ($7_4$) | $(CH_3O)_2\overset{O}{\underset{\|}{P}}-S-\overset{O}{\underset{\|}{S}}-CH_2-CCl_3$ | 1,000<br>100<br>10 | 100<br>90<br>0 | 100<br>100<br>0 |
| ($8_4$) | $(CH_3O)_2\overset{O}{\underset{\|}{P}}-S-\overset{O}{\underset{\|}{S}}-CCl=CHCl$ | 1,000<br>100<br>10 | 100<br>100<br>0 | 100<br>100<br>0 |
| ($9_4$) | $(CH_3O)_2\overset{O}{\underset{\|}{P}}-S-\overset{O}{\underset{\|}{S}}-CH=CCl_2$ | 1,000<br>100<br>10 | 100<br>100<br>0 | 100<br>100<br>0 |
| ($10_4$) | $(C_2H_5O)_2\overset{S}{\underset{\|}{P}}-S-\overset{O}{\underset{\|}{S}}-CHCl-CHCl_2$ | 1,000<br>100<br>10 | 100<br>0<br>0 | 100<br>0<br>0 |
| ($11_4$) | $(C_2H_5O)_2\overset{S}{\underset{\|}{P}}-S-\overset{O}{\underset{\|}{S}}-CH_2-CCl_3$ | 1,000<br>100<br>10 | 90<br>0<br>0 | 100<br>0<br>0 |
| ($12_4$) | $(C_2H_5O)_2\overset{S}{\underset{\|}{P}}-S-\overset{O}{\underset{\|}{S}}CCl=CHCl$ | 1,000<br>100<br>10 | 100<br>0<br>0 | 100<br>100<br>0 |
| ($13_4$) | $(C_2H_5O)_2\overset{S}{\underset{\|}{P}}-S-\overset{O}{\underset{\|}{S}}-CH=CCl_2$ | 1,000<br>100<br>10 | 100<br>0<br>0 | 100<br>30<br>0 |
| ($14_4$) | $(CH_3O)_2\overset{S}{\underset{\|}{P}}-S-\overset{O}{\underset{\|}{S}}-CHCl-CHCl_2$ | 1,000<br>100<br>10 | 100<br>20<br>0 | 100<br>60<br>0 |
| ($15_4$) | $(CH_3O)_2\overset{S}{\underset{\|}{P}}-S-\overset{O}{\underset{\|}{S}}-CH_2-CCl_3$ | 1,000<br>100<br>10 | 100<br>0<br>0 | 100<br>0<br>0 |
| ($16_4$) | $(CH_3O)_2\overset{S}{\underset{\|}{P}}-S-\overset{O}{\underset{\|}{S}}-CCl=CHCl$ | 1,000<br>100<br>10 | 100<br>20<br>0 | 100<br>30<br>0 |
| ($1_5$) | $(CH_3O)_2\overset{S}{\underset{\|}{P}}-S-\overset{O}{\underset{\|}{S}}-CH=CCl_2$ | 1,000<br>100<br>10 | 60<br>0<br>0 | 100<br>0<br>0 |

NOTE.—1 mmg.=0.000001 g.

One ml. of the resulting active compound preparation is placed in a dish and an additional 4 ml. of said solvent are added. The solvent is allowed to evaporate leaving a uniform dry film residue. Ten confused flour beetles (*Tribolium confusum*) are then placed into the dish and covered with a muslin screen.

After each of the periods of time stated in the following table, the degree of destruction is determined and expressed as a percentage: 100% means that all, and 0% means that none, of the test creatures are killed.

EXAMPLE 5.—INSECTICIDAL ACTION

Housefly test [contact action] (*Musca domestica*)

Solvent: 10 milliliters acetone.

To produce a suitable preparation of the particular active compound, 100 mg. of such active compound are mixed with the stated amount of the stated volatile solvent, and the resulting concentrate is diluted with further solvent to the desired final concentration.

One ml. of the resulting active compound preparation is placed into an 8-ounce wide-mouth jar and an additional 4 ml. of said solvent are added. The solvent is allowed to evaporate leaving a uniform dry film residue. Ten to twenty flies (*Musca domestica*) are then placed in the jar and covered with a screen top. A cotton pad soaked in a 10% sugar-water solution is placed on top of the screen as food supply.

After each of the periods of time stated in the following table, the degree of destruction is determined and expressed as a percentage: 100% means that all, and 0% means that none, of the test creatures are killed.

The particular active compounds tested, the amounts used and the results obtained can be seen from the following Table 5:

TABLE 5.—HOUSEFLY TEST (CONTACT ACTION)

| Active compound | | Amount of active compound applied in mmg./dish | Mortality in percent after exposure of housefly for— | |
|---|---|---|---|---|
| | | | 2 hrs. | 18 hrs. |
| ($2_4$) | $(C_2H_5O)_2\overset{O}{\overset{\|}{P}}-S-\overset{O}{\overset{\|}{S}}-CHCl-CHCl_2$ | 1,000<br>100<br>10 | 100<br>20<br>0 | 100<br>100<br>0 |
| ($3_4$) | $(C_2H_5O)_2\overset{O}{\overset{\|}{P}}-S-\overset{O}{\overset{\|}{S}}-CH_2CCl_3$ | 1,000<br>100<br>10 | 100<br>50<br>0 | 100<br>100<br>40 |
| ($4_4$) | $(C_2H_5O)_2\overset{O}{\overset{\|}{P}}-S-\overset{O}{\overset{\|}{S}}-CCl=CHCl$ | 1,000 | 20 | 50 |
| ($5_4$) | $(C_2H_5O)_2\overset{O}{\overset{\|}{P}}-S-\overset{O}{\overset{\|}{S}}-CH=CCl_2$ | 1,000 | 30 | 50 |
| ($6_4$) | $(CH_3O)_2\overset{O}{\overset{\|}{P}}-S-\overset{O}{\overset{\|}{S}}-CHCl-CHCl_2$ | 1,000<br>100<br>10 | 100<br>0<br>0 | 100<br>100<br>50 |
| ($7_4$) | $(CH_3O)_2\overset{O}{\overset{\|}{P}}-S-\overset{O}{\overset{\|}{S}}-CH_2-CCl_3$ | 1,000<br>100<br>10 | 100<br>0<br>0 | 100<br>80<br>40 |
| ($8_4$) | $(CH_3O)_2\overset{O}{\overset{\|}{P}}-S-\overset{O}{\overset{\|}{S}}-CCl=CHCl$ | 1,000<br>100<br>10 | 100<br>90<br>60 | 100<br>100<br>100 |
| ($9_4$) | $(CH_3O)_2\overset{O}{\overset{\|}{P}}-S-\overset{O}{\overset{\|}{S}}-CH=CCl_2$ | 1,000<br>100<br>10 | 100<br>90<br>60 | 100<br>100<br>100 |
| ($10_4$) | $(C_2H_5O)_2\overset{S}{\overset{\|}{P}}-S-\overset{O}{\overset{\|}{S}}-CHCl-CHCl_2$ | 1,000<br>100<br>10 | 90<br>0<br>0 | 100<br>90<br>10 |
| ($11_4$) | $(C_2H_5O)_2\overset{S}{\overset{\|}{P}}-S-\overset{O}{\overset{\|}{S}}-CH_2-CCl_3$ | 1,000<br>100<br>10 | 70<br>10<br>0 | 100<br>100<br>40 |
| ($12_4$) | $(C_2H_5O)_2\overset{S}{\overset{\|}{P}}-S-\overset{O}{\overset{\|}{S}}-CCl=CHCl$ | 1,000<br>100<br>10 | 90<br>0<br>60 | 100<br>40<br>50 |
| ($13_4$) | $(C_2H_5O)_2\overset{S}{\overset{\|}{P}}-S-\overset{O}{\overset{\|}{S}}-CH=CCl_2$ | 1,000<br>100<br>10 | 90<br>0<br>0 | 100<br>80<br>50 |
| ($14_4$) | $(CH_3O)_2\overset{S}{\overset{\|}{P}}-S-\overset{O}{\overset{\|}{S}}-CHCl-CHCl_2$ | 1,000<br>100<br>10 | 100<br>0<br>0 | 100<br>40<br>20 |
| ($15_4$) | $(CH_3O)_2\overset{S}{\overset{\|}{P}}-S-\overset{O}{\overset{\|}{S}}-CH_2-CCl_3$ | 1,000<br>100<br>10 | 100<br>0<br>0 | 100<br>40<br>40 |
| ($16_4$) | $(CH_3O)_2\overset{S}{\overset{\|}{P}}-S-\overset{O}{\overset{\|}{S}}-CCl=CHCl$ | 1,000<br>100<br>10 | 100<br>10<br>0 | 100<br>70<br>30 |
| ($1_5$) | $(CH_3O)_2\overset{S}{\overset{\|}{P}}-S-\overset{O}{\overset{\|}{S}}-CH=CCl_2$ | 1,000<br>100<br>10 | 100<br>0<br>0 | 90<br>60<br>40 |

Note.—1 mm.=0.000001 g.

The following further examples are set forth to illustrate, without limitation, the process for producing the active compounds according to the present invention:

EXAMPLE 6

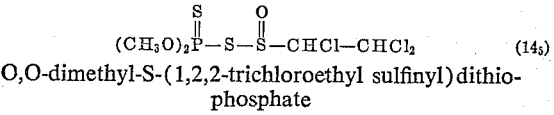

O,O-dimethyl-S-(1,2,2-trichloroethyl sulfinyl)dithiophosphate 16.3 g. (0.1 mol) of 90% pure O,O-dimethyl-dithiophosphoric acid were dissolved in 100 ml. of chloroform.

20 g. (0.09 mol) of 1,2,2-trichloroethyl sulfinyl chloride were added dropwise with stirring at 30–35° C. followed by refluxing of the reaction mixture until the evolution of hydrogen chloride had ceased (about 4 hours). Washing the resulting mixture with water until neutral, drying over MgSO₄, filtering and then evaporating the filtered solution in high vacuum gave 29.5 g. (94% yield) of the desired O,O-dimethyl-S-(1,2,2 - trichloroethyl sulfinyl) dithiophosphate in the form of a yellow oil, $n_D^{21}$ 1.5654.

EXAMPLE 7

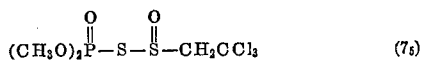 (7₅)

O,O-dimethyl-S-(2,2,2-trichloroethyl sulfinyl) thiolphosphate 17.5 g. (0.08 mol) 2,2,2-tri-chloroethyl sulfinyl chloride were added dropwise at 30° C. to 12.5 g. (0.088 mol) 92% O,O-dimethyl thiophosphate dissolved in 100 ml. CHCl₃ over a period of one hour. After the addition, the reaction mixture was stirred for three hours and then refluxed for four hours (until no more HCl evolved). The CHCl₃ solution was washed with H₂O, dried over MgSO₄, filtered and stripped, giving 23.9 g. (92% yield) of the stated compound in the form of a light yellow liquid, $n_D^{22}$ 1.5205.

EXAMPLE 8

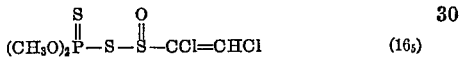 (16₅)

O,O-dimethyl-S-(1,2-dichlorovinyl sulfinyl) dithiophosphate 6.75 g. (0.02 mol) O,O-dimethyl-S-(1,2,2 - trichloroethyl sulfinyl) dithiophosphate were dissolved in 100 ml. Skellysolve B and 20.02 g. (0.02 mol) triethylamine were added at 30° C. The hydrochloride which formed was filtered after the reaction had reached completion. The Skellysolve B¹ was stripped giving 5 g. (84% yield) of the stated compound in the form of a red-brown liquid, $n_D^{26}$ 1.5707.

EXAMPLE 9

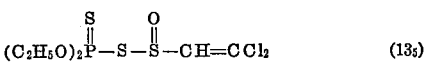 (13₅)

O,O-diethyl-S-(2,2-dichlorovinyl sulfinyl) dithiophosphate 9.3 g. (0.05 mol), O,O-diethyl dithiophosphate were dissolved in 100 ml. CHCl₃ and 8 g. (0.05 mol) 2,2-dichlorovinyl sulfinyl chloride were added at 30° C., allowing HCl to escape. The reaction mixture was refluxed until no more HCl evolution could be detected, then washed with H₂O, dried over MgSO₄, filtered and stripped, giving 15.2 g. (100% yield) of the stated compound in the form of a yellow liquid, $n_D^{24}$ 1.5555.

EXAMPLE 10

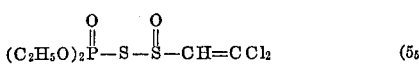 (5₅)

O,O-diethyl-S-(2,2-dichlorovinyl sulfinyl)thiolphosphate 6.9 g. (0.02 mol) O,O-diethyl-S-(2,2,2 - trichloroethyl sulfinyl) thiophosphate were dissolved in 100 ml. Skellysolve B and 2.02 g. (0.02 mol) triethylamine were added at 30° C. The reaction mixture turned dark as the amine salt was formed. After refluxing for three hours, the Skellysolve B was stripped, the residue dissolved in HCCl₃, washed with H₂O, dried over MgSO₄, filtered and stripped, giving 4.5 g. (72% yield) of the stated compound in the form of a red liquid, $n_D^{24}$ 1.4914.

¹ "Skellysolve B" is commercial hexane of boiling range 61–70° C. (143–158° F.).

The following compounds are prepared in analogous manner:

| | Structure | Description |
|---|---|---|
| (6₅) | CH₃O\P(=O)(–S–S(=O)–CHCl–CHCl₂)/CH₃O | Light yellow oil. 78% yield. $n_D^{22}$ 1.5150. |
| (8₅) | CH₃O\P(=O)(–S–S(=O)–CCl=CHCl)/CH₃O | Dark oil. 67% yield. $n_D^{22}$ 1.5026. |
| (9₅) | CH₃O\P(=O)(–S–S(=O)–CH=CCl₂)/CH₃O | Orange oil. 72% yield. $n_D^{22}$ 1.5900. |
| (2₅) | C₂H₅O\P(=O)(–S–S(=O)–CHCl–CHCl₂)/C₂H₅O | Yellow oil. 84% yield. $n_D^{22}$ 1.5100. |
| (3₅) | C₂H₅O\P(=O)(–S–S(=O)–CH₂–CCl₃)/C₂H₅O | Yellow oil. 85% yield. $n_D^{22}$ 1.5050. |
| (4₅) | C₂H₅O\P(=O)(–S–S(=O)–CCl=CHCl)/C₂H₅O | Dark oil. 78% yield. $n_D^{22}$ 1.5812. |
| (15₅) | CH₃O\P(=S)(–S–S(=O)–CH₂–CCl₃)/CH₃O | Yellow oil. 83% yield. $n_D^{22}$ 1.5655. |
| (1₅) | CH₃O\P(=S)(–S–S(=O)–CH=CCl₂)/CH₃O | Dark oil. 88% yield. $n_D^{22}$ 1.5520. |
| (10₅) | C₂H₅O\P(=S)(–S–S(=O)–CHCl–CHCl₂)/C₂H₅O | Yellow oil. Quant. yield. $n_D^{22}$ 1.5576. |
| (11₅) | C₂H₅O\P(=S)(–S–S(=O)–CH₂–CCl₃)/C₂H₅O | Yellow oil. 81% yield. $n_D^{22}$ 1.5534. |
| (12₅) | C₂H₅O\P(=S)(–S–S(=O)–CCl–CHCl)/C₂H₅O | Dark oil. 70% yield. $n_D^{22}$ 1.5510. |

EXAMPLE 11

The corresponding O,O-di- n-propyl, isopropyl, -n-butyl, -isobutyl, -sec.-butyl and -tert.-butyl -S-(2,2,2- and 1,2,2-trichloroethyl- and 2,2- and 1,2-dichlorovinylsulfinyl)-thiol and dithio phosphates may be prepared in analogous manner from the appropriate starting thiol and dithio phosphoric acid esters (II) and sulfinyl chlorides (III) or (IV), as the case may be, such final compounds similarly possessing relatively strong fungicidal, nematocidal and insecticidal properties.

As examples of sulfinyl thiol- and dithio-phosphates of Formula I in which R' is ethyl or vinyl having three or two chloro substituents, respectively, and X is oxygen or sulfur and R is lower alkyl of 1–4 carbon atoms according to the present invention, there may be mentioned in particular:

O,O-di-n-butyl-S-(2,2,2-trichloroethyl sulfinyl)-dithiophate,
O,O-dimethyl-S-(2,2,2-trichloroethyl sulfinyl)-thiolphosphate,
O,O-diethyl-S-(1,2,2-trichloroethyl sulfinyl)-thiolphosphate,
O,O-diethyl-S-(2,2,2-trichloroethyl sulfinyl)-thiolphosphate,
O,O-dimethyl-S-(1,2,2-trichloroethyl sulfinyl)-dithiophosphate, O,O-dimethyl-S-(2,2,2-trichloroethyl sulfinyl)-dithiophosphate,
O,O-diethyl-S-(1,2,2-trichloroethyl sulfinyl)-dithiophosphate,
O,O-diethyl-S-(2,2,2-trichloroethyl sulfinyl)-dithiophosphate,
O,O-di-n-propyl-S-(1,2,2-trichloroethyl sulfinyl)-thiolphosphate,
O,O-diisopropyl-S-(1,2,2-trichloroethyl sulfinyl)-thiolphosphate,
O,O-diisopropyl-S-(2,2,2-trichloroethyl sulfinyl)-thiolphosphate,
O,O-diisopropyl-S-(2,2,2-trichloroethyl sulfinyl)-dithiophosphate,
O,O-diisopropyl-S-(1,2,2-trichloroethyl sulfinyl)-dithiophosphate,
O,O-di-n-butyl-S-(2,2,2-trichloroethyl sulfinyl)-thiophosphate,
O,O-di-n-butyl-S-(2,2,2-trichloroethyl sulfinyl)-dithiophosphate,
O,O-di-n-butyl-S-(1,2,2-trichloroethyl sulfinyl)-dithiophosphate,
O,O-dimethyl-S-(1,2-dichlorovinyl sulfinyl)-thiolphosphate,
O,O-dimethyl-S-(2,2-dichlorovinyl sulfinyl)-thiolphosphate,
O,O-diethyl-S-(1,2-dichlorovinyl sulfinyl)-thiolphosphate,
O,O-diethyl-S-(2,2-dichlorovinyl sulfinyl)-thiolphosphate,
O,O-dimethyl-S-(1,2-dichlorovinyl sulfinyl)-dithiophosphate,
O,O-dimethyl-S-(2,2-dichlorovinyl sulfinyl)-dithiophosphate,
O,O-diethyl-S-(2,2-dichlorovinyl sulfinyl)-dithiophosphate,
O,O-diethyl-S-(1,2-dichlorovinyl sulfinyl)-dithiophosphate,
O,O-di-n-propyl-S-(2,2-dichlorovinyl sulfinyl)-dithiophosphate,
O,O-diisopropyl-S-(1,2-dichlorovinyl sulfinyl)-thiophosphate,
O,O-diisopropyl-S-(2,2-dichlorovinyl sulfinyl)-dithiophosphate,
O,O-di-n-butyl-S-(2,2-dichlorovinyl sulfinyl)-dithiophosphate,
O,O-di-n-butyl-S-(1,2-dichlorovinyl sulfinyl)-dithiophosphate,
O,O-di-sec.-butyl-S-(1,2-dichlorovinyl sulfinyl)-thiolphosphate,
O,O-di-sec.-butyl-S-(2,2-dichlorovinyl sulfinyl)-dithiophosphate, and the like.

It will be realized by the artisan that all of the foregoing compounds contemplated by the present invention possess the desired strong pesticidal, especially insecticidal, nematocidal and fungicidal, properties for combating insects, nematodes and fungi, with regard to a broad spectrum of activity, as well as a comparatively low toxicity toward warm-blooded creatures, and a concomitantly low phytotoxicity, enabling such compounds to be used with correspondingly favorable compatibility with warm-blooded creatures and higher plants for more effective control and/or elimination of insects, nematodes and fungi by application of such compounds to such insects, nematodes and fungi and/or their corresponding habitat.

It will be appreciated that the instant specification and examples are set forth by way of illustration and not limitation, and that various modifications and changes may be made without departing from the spirit and scope of the present invention.

What is claimed is:
1. Sulfinyl thiophosphate of the formula

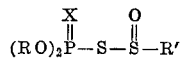

in which R is lower alkyl of 1–4 carbon atoms, R' is selected from the group consisting of trichloroethyl and dichlorovinyl, and X is selected from the group consisting of oxygen and sulfur.

2. Compound according to claim 1 wherein R is $C_{1-2}$ alkyl, R' is selected from the group consisting of 1,2,2-trichloroethyl, 2,2,2-trichloroethyl, 1,2-dichlorovinyl and 2,2-dichlorovinyl, and X is selected from the group consisting of oxygen and sulfur.

3. Compound according to claim 1 wherein R is $C_{1-2}$ alkyl, R' is selected from the group consisting of 1,2,2-trichloroethyl and 2,2,2-trichloroethyl, and X is selected from the group consisting of oxygen and sulfur.

4. Compound according to claim 1 wherein R is $C_{1-2}$ alkyl, R' is selected from the group consisting of 1,2-dichlorovinyl and 2,2-dichlorovinyl, and X is selected from the group consisting of oxygen and sulfur.

5. Compound according to claim 1 wherein such compound is O,O-dimethyl-S-(2,2-dichlorovinyl-sulfinyl)-thiolphosphate of the formula

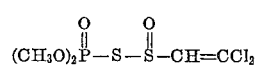

6. Compound according to claim 1 wherein such compound is O,O-dimethyl-S-(1,2,2-trichloroethyl-sulfinyl)-dithiophosphate of the formula

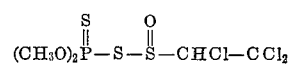

7. Compound according to claim 1 wherein such compound is O,O-dimethyl-S-(1,2-dichlorovinyl-sulfinyl)-thiolphosphate of the formula

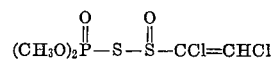

8. Compound according to claim 1 wherein such compound is O,O-diethyl-S-(1,2,2-trichloroethyl-sulfinyl)-dithiophosphate of the formula

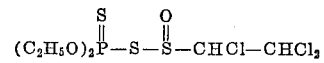

9. Compound according to claim 1 wherein such compound is O,O-diethyl - S - (2,2,2-trichloroethyl-sulfinyl)-thiol-phosphate of the formula

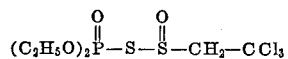

10. Compound according to claim 1 wherein such compound is O,O-diethyl-S-(1,2-dichlorovinyl-sulfinyl)-thiolphosphate of the formula

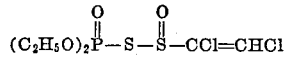

11. Compound according to claim 1 wherein such compound is O,O-diethyl-S-(2,2,2-trichloroethyl-sulfinyl)-dithiophosphate of the formula

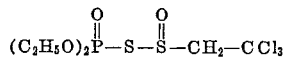

12. Compound to claim 1 wherein such compound is O,O-dimethyl - S - (1,2-dichlorovinyl-sulfinyl)-dithiophosphate of the formula

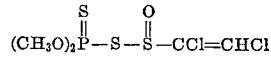

References Cited

FOREIGN PATENTS 941,810  11/1963  Great Britain _____ 260—934

CHARLES B. PARKER, Primary Examiner

A. H. SUTTO, Assistant Examiner

U.S. Cl. X.R.

260—543 R, 978, 986; 424—208

UNITED STATES PATENT OFFICE
CERTIFICATE OF CORRECTION

Patent No. 3629375            Dated December 21, 1971

Inventor(s) Paul C. Aichenegg, et al

It is certified that error appears in the above-identified patent and that said Letters Patent are hereby corrected as shown below:

Col. 2, line 29

"$(CH_3O_2)_2$" should be --$(CH_3O)_2$

Col. 3, line 46

"a llowed" should be --allowed--

Col. 6, line 65

"product" should be --produce--

Col. 7, line 3

"gungi" should be --fungi--

Col. 7, line 6

"to" (first occurrence) should be --in--

Col. 7, line 13

"there" should be --their--

Col. 10, lines 66/67

Lines 66 and 67 should precede Col. 10, line 1.

Col. 17, line 37

"20.02" should be --2.02--

UNITED STATES PATENT OFFICE
CERTIFICATE OF CORRECTION

Patent No. 3629375  Dated December 21, 1971

Inventor(s) Paul C. Aichenegg, et al.

It is certified that error appears in the above-identified patent and that said Letters Patent are hereby corrected as shown below:

Col. 17, line 41

"B'" should be --B--

Col. 18, line 10

"$\eta_D^{22}$" should be --$\eta_D^{26}$--.

Col. 18, line 14

"$n_D^{22} 1.5900$" should be --$n_D^{20} 1.5090$--

Col. 18, line 17

"$n_D^{22}$ should be --$n_D^{16}$--

Col. 18, line 22

"$n_D^{22}$" should be --$n_D^{18}$--

Col. 18, line 26

"$n_D^{22}$" should be --$n_D^{23}$--

Col. 18, line 30

"$n_D^{22}$" should be --$n_D^{21}$--

Col. 18, line 34

"$n_D^{22}$" should be --$n_D^{26}$--

UNITED STATES PATENT OFFICE
CERTIFICATE OF CORRECTION

Patent No. 3629375            Dated December 21, 1971

Inventor(s) Paul C. Aichenegg, et al.

It is certified that error appears in the above-identified patent and that said Letters Patent are hereby corrected as shown below:

Col. 18, line 37

"$n_D^{22}$" should be --$n_D^{20}$--

Col. 18, line 43

"$n_D^{22}$" should be --$n_D^{21}$--

Col. 18, line 46

"$n_D^{22}$" should be --$n_D^{24}$--

Signed and sealed this 20th day of June 1972.

(SEAL)
Attest:

EDWARD M. FLETCHER, JR.      ROBERT GOTTSCHALK
Attesting Officer               Commissioner of Patents